United States Patent
Anguelov et al.

(10) Patent No.: US 8,363,427 B2
(45) Date of Patent: Jan. 29, 2013

(54) BI-DIRECTIONAL POWER CONVERTER WITH REGULATED OUTPUT AND SOFT SWITCHING

(75) Inventors: Gueorgui Iordanov Anguelov, Burnaby (CA); Roumen Dimitrov Petkov, Burnaby (CA)

(73) Assignee: Greecon Technologies Ltd., Burnaby (CA)

( * ) Notice: Subject to any disclaimer, the term of this patent is extended or adjusted under 35 U.S.C. 154(b) by 258 days.

(21) Appl. No.: 12/823,499

(22) Filed: Jun. 25, 2010

(65) Prior Publication Data
US 2011/0317452 A1    Dec. 29, 2011

(51) Int. Cl.
- H02M 3/335 (2006.01)
- H02M 7/217 (2006.01)
- H02M 7/5387 (2007.01)

(52) U.S. Cl. ........ 363/21.02; 363/17; 363/127; 363/132

(58) Field of Classification Search .............. 363/17, 363/21.02, 21.03, 21.06, 127, 132, 133
See application file for complete search history.

(56) References Cited

U.S. PATENT DOCUMENTS

| | | | |
|---|---|---|---|
| 5,140,509 A | 8/1992 | Murugan | |
| 5,255,174 A | 10/1993 | Murugan | |
| 5,539,630 A | 7/1996 | Pietkiewicz | |
| 6,205,035 B1 | 3/2001 | Vollmer | |
| 6,256,214 B1* | 7/2001 | Farrington et al. | 363/127 |
| 6,330,170 B1 | 12/2001 | Wang | |
| 6,370,050 B1* | 4/2002 | Peng et al. | 363/98 |
| 6,574,125 B2 | 6/2003 | Matsukawa | |
| 6,587,359 B2* | 7/2003 | Raets et al. | 363/24 |
| 7,352,600 B2 | 4/2008 | Nomura | |
| 7,433,207 B2 | 10/2008 | Thor | |
| 8,040,697 B2* | 10/2011 | Zhou et al. | 363/21.02 |
| 2011/0261590 A1* | 10/2011 | Liu | 363/17 |

OTHER PUBLICATIONS

R. Petkov: "Analysis and Optimisation of a Multi-Resonant Converter Employed in a Telecom Rectifier", 21-st International Telecommunication Energy Conference Intelec'99, Copenhagen, Denmark, Jun. 1999, poster 41.

Diambo Fu et al.: "1MHz High Efficiency LLC Resonant Converters with Synchronous Rectifier" 38-th Annual Power Electronics Specialists Conference PESC'07, Orlando, FL, USA, Jun. 2007, pp. 2404-2410.

* cited by examiner

*Primary Examiner* — Gary L Laxton
*Assistant Examiner* — Zekre Tsehaye
(74) *Attorney, Agent, or Firm* — Oyen Wiggs Green & Mutala LLP

(57) ABSTRACT

A resonant, bi-directional, DC to DC voltage converter with loss-less (soft) switching having regulated output and capable of converting power between two, high-potential and low-potential DC voltage sources. The converter's semiconductor and magnetic components provide both, output regulation and soft switching in both (step-down and step-up) directions of power conversion which reduces total component count, cost and volume and enhances power conversion efficiency.

24 Claims, 6 Drawing Sheets

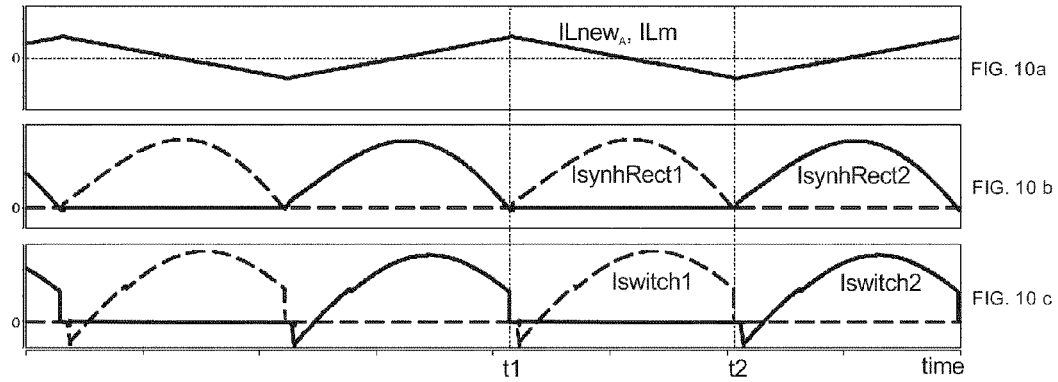
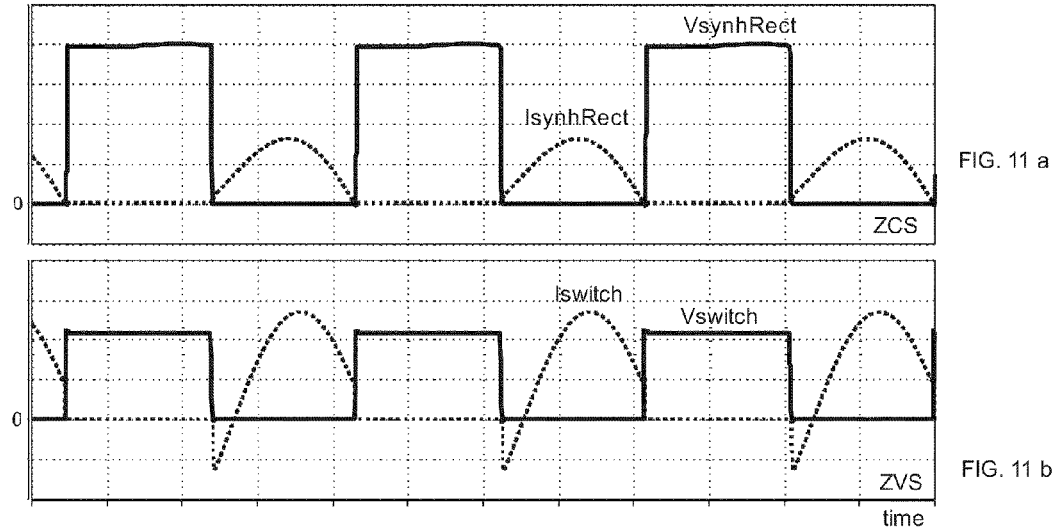

BI-DIRECTIONAL POWER CONVERTER WITH REGULATED OUTPUT AND SOFT SWITCHING

FIELD OF THE INVENTION

The present invention relates to a bi-directional and isolated DC to DC power converters featuring soft, loss-less switching operation and output voltage controllability in both directions of power transfer. In addition, the present invention maintains the soft-switching operation and output voltage controllability within the entire load operating range (i.e. from no-load to full-load).

BACKGROUND OF THE INVENTION

Today's DC to DC switch mode power converters are typically required to provide insulation between the primary and secondary sides and to have high power density, high efficiency and low cost. In addition, many applications including uninterruptable power supplies (UPS), power supplies utilizing renewable energy sources (e.g. solar, wind, fuel cells), as well as aerospace power supplies require bi-directional (step-up and step-down) power conversion with isolated and regulated output. Examples of isolated and pulse width modulation (PWM) regulated bi-directional DC to DC converters are described in U.S. Pat. No. 5,140,509, U.S. Pat. No. 5,255,174, U.S. Pat. No. 7,433,207, U.S. Pat. No. 6,370,050 and U.S. Pat. No. 6,205,035. The pulse width modulation techniques control techniques employed in these converters typically feature so called "hard-switching" which can lead to significant switching losses and adversely impact the ability to achieve high power densities and high power conversion efficiencies.

Zero-voltage switching (ZVS) and zero-current switching (ZCS) are well established switching techniques for reducing switching losses which in turn allows for higher switching frequencies, reduced size of magnetic components, increased power density and reduced cost. U.S. Pat. No. 5,539,630, U.S. Pat. No. 6,370,050 and U.S. Pat. No. 6,330,170 describe bi-directional converters that feature ZVS but only in one of the directions of power conversion.

There is a need for an improved bi-directional DC to DC converter having a wide range of output voltage controllability in both directions of power transfer.

There is a need for an improved bi-directional DC to DC converter having a wide range of output voltage controllability in both directions of power transfer, the bi-directional DC to DC converter further providing galvanic isolation between the power source and the load.

There is a need for an improved bi-directional DC to DC converter having a wide range of output voltage controllability in both directions of power transfer, the bi-directional DC to DC converter employing the same components for power conversion in both directions of power transfer to reduce costs.

There is a need for series type, frequency controlled, bi-directional DC to DC resonant converter having a wide range output voltage controllability in both directions of power transfer, the resonant converter providing for loss-less switching operation in both directions of power transfer; loss-less switching operation within the whole range of load conditions (i.e. from no-load to full-load) and loss-less switching operation for all semiconductor devices in the circuitry.

SUMMARY OF THE INVENTION

Briefly, the present invention relates to improved bi-directional DC to DC converters. In particular, the present invention provides for an improved series type, frequency controlled, bi-directional DC to DC resonant converter that not only allows for a full control of the output voltage in both direction of power transfer, but when properly dimensioned, can provide ZVS for the input section devices (i.e. the ones connected to the power source) and ZCS for the output section devices (i.e. the ones connected to the load) in both directions of power transfer and for all load conditions. The combination of ZVS and ZCS for all devices enhances the power conversion efficiency and the use of the same components for bi-directional power conversion is a major contributor of achieving very high power density. The loss-less switching provided by embodiments of the present invention allows for further increase in the power density by operating at higher switching frequencies. It is well known that the increase of the switching frequency reduces the size of all magnetic and filter components. This is a distinctive advantage of the present invention compared with conventional PWM-controlled, bi-directional converters that feature hard-switching in at least one of the directions of power conversion.

Various embodiments of the present invention can employ input, or primary section devices, that are connected in full-bridge, half-bridge, or push-pull switcher ("chopper") configurations that chop the power source voltage (i.e. with the switching frequency), which is then applied to the resonant network circuit of the present invention, while the output, or secondary section devices, are connected in a full-bridge, half-bridge, or push-pull configurations and are controlled in a synchronous rectification manner. To reverse the direction of power transfer the control functions of the primary section devices and the secondary section devices are swapped (i.e. the devices that have performed synchronous rectification perform the "chopping" function while the former chopper devices perform the synchronous rectification function). The resonant circuit of various embodiments of the present invention is arranged in such a way that when its input/output terminals are swapped, which is the default function of the bi-directional converter, both loss-less switching (i.e. ZVS and ZCS operation) and the output voltage controllability of the circuitry is maintained.

In a first aspect of the invention, there is provided a bi-directional DC to DC converter that includes a first resonant tank circuit employed during power transfer along a first direction through the bi-directional DC to DC converter and a second resonant tank circuit employed during power transfer along a second direction through the bi-directional DC to DC converter. The second direction opposes the first direction.

In a feature of this aspect of the invention, the first resonant tank circuit shares at least two common resonant components with the second resonant tank circuit and the first resonant tank circuit further includes a first resonant component that is different from a second resonant component of the second resonant tank circuit.

In another feature of this aspect, the at least two common resonant components include a capacitor connected in series with an inductor. The first resonant component includes a first inductor connected in series with the at least two common resonant components and the second resonant component includes a second inductor connected in series with the at least two common resonant components.

In yet another feature of this aspect, the at least two common resonant components are connected in series with a first load circuit and the first inductor is connected in parallel with the first load circuit during the power transfer along the first direction. The at least two common resonant components are connected in series with a second load circuit and the second inductor is connected in parallel with the second load circuit during the power transfer along the second direction.

In another feature of this aspect, the bi-directional DC to DC converter includes a transformer, the transformer including a primary side connected in series with the at least two common resonant components and connected in parallel with the first inductor. The at least two common resonant components are connected in series with a full-bridge switcher circuit and the second inductor is connected in parallel with the full-bridge switcher circuit. The transformer includes a secondary side connected to one of a full-bridge synchronous rectifier circuit, a half-bridge synchronous rectifier circuit and a push-pull synchronous rectifier circuit.

In yet another feature of this aspect, the bi-directional DC to DC converter includes a transformer, the transformer including a primary side connected in series with the at least two common resonant components and connected in parallel with the first inductor. The at least two common resonant components are connected in series with a half-bridge switcher circuit and the second inductor is connected in parallel with the half-bridge switcher circuit. The transformer includes a secondary side connected to one of a full-bridge synchronous rectifier circuit, a half-bridge synchronous rectifier circuit and a push-pull synchronous rectifier circuit.

In yet another feature of this aspect, the bi-directional DC to DC converter includes a transformer, the transformer including a primary side connected in series with the at least two common resonant components and connected in parallel with the first inductor. The at least two common resonant components are connected in series with a push-pull switcher circuit and the second inductor is connected in parallel with the push-pull switcher circuit. The transformer includes a secondary side connected to one of a full-bridge synchronous rectifier circuit, a half-bridge synchronous rectifier circuit and a push-pull synchronous rectifier circuit.

In yet another feature of this aspect, the first resonant tank circuit and the second resonant tank circuit include the same resonant configuration.

In a second aspect of the present invention, there is provided a bi-directional DC to DC converter that includes an electronic circuit adapted to provide a first resonant tank circuit during a first power transfer mode through the bi-directional DC to DC converter and a second resonant tank circuit during a second power transfer mode through the bi-directional DC to DC converter. The electronic circuit includes a first terminal set, a second terminal set, at least one capacitor and a plurality of inductors. The plurality of inductors include a first inductor positioned between at least two terminals in the first terminal set and a second inductor positioned between at least two terminals in the second terminal set.

In a feature of this aspect of the invention, a first load circuit is connected to the first terminal set during the first power transfer mode and a second load circuit is connected to the second terminal set during the second power transfer mode. The at least one capacitor and at least one inductor of the plurality of inductors is connected in series with the first load circuit and the first inductor is connected in parallel with the first load circuit during the first power transfer mode. The at least one capacitor and the at least one inductor of the plurality of inductors is connected in series with the second load circuit and the second inductor is connected in parallel with the second load circuit during the second power transfer mode.

In another feature of this aspect, the bi-directional DC to DC includes a transformer, the transformer including a primary side connected to the first terminal set, wherein the at least one capacitor and at least one inductor of the plurality of inductors is connected in series with the transformer. The bi-directional DC to DC converter includes a full-bridge switcher circuit connected to the second terminal set, and the at least one capacitor and the at least one inductor of the plurality of inductors are connected in series with the full-bridge switcher circuit. The transformer includes a secondary side connected to one of a full-bridge synchronous rectifier circuit, a half-bridge synchronous rectifier circuit and a push-pull synchronous rectifier circuit.

In yet another feature of this aspect, the bi-directional DC to DC includes a transformer, the transformer including a primary side connected to the first terminal set, wherein the at least one capacitor and at least one inductor of the plurality of inductors is connected in series with the transformer. The bi-directional DC to DC converter includes a half-bridge switcher circuit connected to the second terminal set, and the at least one capacitor and the at least one inductor of the plurality of inductors are connected in series with the half-bridge switcher circuit. The transformer includes a secondary side connected to one of a full-bridge synchronous rectifier circuit, a half-bridge synchronous rectifier circuit and a push-pull synchronous rectifier circuit.

In yet another feature of this aspect, the bi-directional DC to DC includes a transformer, the transformer including a primary side connected to the first terminal set, wherein the at least one capacitor and at least one inductor of the plurality of inductors is connected in series with the transformer. The bi-directional DC to DC converter includes a push-pull switcher circuit connected to the second terminal set, and the at least one capacitor and the at least one inductor of the plurality of inductors are connected in series with the push-pull switcher circuit. The transformer includes a secondary side connected to one of a full-bridge rectifier circuit, a full-bridge synchronous rectifier circuit, a half-bridge rectifier circuit, a half bridge synchronous rectifier circuit, a push-pull rectifier circuit and a push-pull synchronous rectifier circuit.

In another feature of this aspect, the bi-directional DC to DC converter includes a transformer and the first inductor is implemented as a magnetizing inductor of the transformer and the second inductor is implemented as an external inductor.

In a third aspect of the invention, there is provided bi-directional DC to DC converter that includes a switcher circuit adapted for generating a square-wave voltage waveform; a transformer that includes a primary side and secondary side; a first resonant tank circuit connected between the switcher circuit and the transformer, the first resonant tank circuit including a first inductor connected in parallel with the primary side of the transformer; a second resonant tank circuit connected between the switcher circuit and the transformer, the second resonant tank circuit including a second inductor connected in parallel with the switcher circuit; and a synchronous rectifier circuit connected to the secondary side of the transformer.

In a feature of this aspect, each of the first resonant tank circuit and the second resonant tank circuit include at least one capacitor and at least one inductor that are connected in series with the switcher circuit and the primary side of the transformer.

In another feature of this aspect, each of the first resonant tank circuit and the second resonant tank circuit share at least one capacitor and at least one inductor that are connected in series with the switcher circuit and the primary side of the transformer.

In another feature of this aspect, the switcher circuit includes one of a full-bridge switcher circuit, a half-bridge switcher circuit and a push-pull switcher circuit. The synchronous rectifier circuit includes one of a full-bridge synchronous rectifier circuit, a half-bridge synchronous rectifier circuit and a push-pull synchronous rectifier circuit. The synchronous rectifier circuit also can include one of a dissipative snubber and a non-dissipative snubber.

In yet another feature of this aspect, the first resonant tank circuit and the second resonant tank circuit include the same resonant configuration.

In other aspects, the invention provides combinations and subsets of the aspects described above.

BRIEF DESCRIPTION OF THE DRAWINGS

Embodiments and applications of the invention are illustrated by the attached non-limiting drawings. The attached drawings are for purposes of illustrating the concepts of the invention and may not be to scale.

FIGS. 10 (a-c) show respectively the current thorough the additional inductor $Lnew_A$, the currents through the synchronous rectifiers and the currents through the switching devices of the circuit of FIG. 1;

FIGS. 11 (a-b) show combined voltage and current waveforms plots respectively of a synchronous rectifier and a switcher employed by an LLC converter.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures have not been shown or described in detail to avoid unnecessarily obscuring descriptions of the embodiments of the invention.

Figure 1:
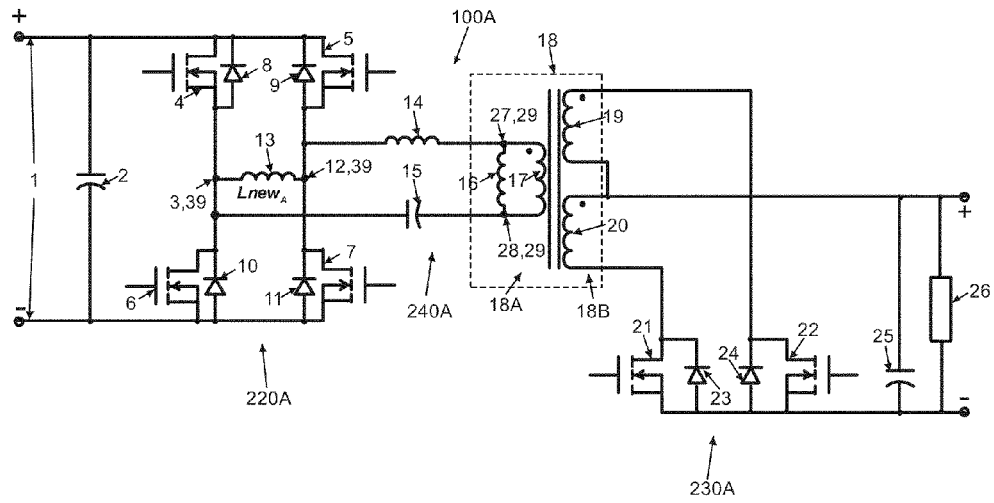
FIG. 1 shows a schematic circuit of an example embodiment of the present invention employing a full-bridge primary section and a push-pull secondary section.

A schematic of an example embodiment of the bi-directional converter 100A embodying the principles of the present invention is shown in FIG. 1. In the case of power transfer from the left hand side to the right hand side of the circuitry in FIG. 1, a full-bridge switcher circuit 220A containing controlled switching devices 4, 5, 6, and 7 that include embedded, or external, anti-parallel diodes 8, 9, 10, and 11 is connected to a DC voltage source 1. Switching devices such as switching devices 4, 5, 6, and 7 employed by the present invention can include MOSFETs, IGBTs, GTOs, BJTs by way of non-limiting example. A filter capacitor 2 is connected in parallel to the DC voltage source 1 to filter out switching ripple. Switching devices 4, 5, 6 and 7 are turned on and off with approximately 50% duty cycle width and their switching frequency is controlled so that full-bridge switcher circuit 220A produces square-wave voltage waveform with 50% duty cycle and variable frequency on terminals 3 and 12. An inductor 13 is connected across the terminals 3 and 12. A series network that includes inductor 14, capacitor 15 and magnetising inductor 16 is connected to terminals 3 and 12. Magnetising inductor 16 is connected in parallel with the primary winding 17 located on the primary side 18A of transformer 18. It is noted that transformers such as transformer 18 are schematically represented by dashed lines in associated ones of the Figures. To reduce the number of magnetic components magnetising inductor 16 is usually embedded in the magnetic structure of transformer 18. The value of the magnetising inductance can be controlled in such case by introducing an air gap in the magnetic core and adjusting its length. The secondary windings 19 and 20 located on the secondary side 18B of transformer 18 include equal number of winding turns and are connected in centre-tap configuration in which the centre-tap terminal is connected to the positive terminal of a load impedance 26, while the ends of the secondary windings are connected to a push-pull rectifier circuit 230A that includes controlled switching devices 21 and 22 that include embedded, or external, anti-parallel diodes 23 and 24. Switching devices 21 and 22 are controlled in a synchronous rectification manner with approximately 50% duty cycle control pulse-width to rectify the square-wave voltage produced by the secondary windings 19 and 20. A common point of switching devices 21 and 22, and anti-parallel diodes 23 and 24 is connected to the negative terminal of the load impedance 26. A filter capacitor 25 is connected in parallel to load impedance 26 in this load circuit. In this example embodiment, push-pull rectifier circuit 230A is employed as push-pull synchronous rectifier circuit.

In case of power transfer from the right hand side to left hand side of the circuitry in FIG. 1, the power source and the load exchange their places, i.e. load impedance 26 becomes a DC voltage source, while DC voltage source 1 becomes a load. In addition, the switching devices 21 and 22 become a push-pull controlled switcher with controlled switching frequency and approximately 50% duty cycle width that produces square-wave voltage with variable frequency across the terminals 27 and 28 of the primary side 18A of transformer 18. Furthermore, the full-bridge switcher circuit 220A becomes a synchronously controlled rectifier circuit with approximately 50% duty cycle control pulse-width that rectifies the square-wave voltage on terminals 3 and 12 produced by the switching devices 21 and 22.

A multi-resonant converter, known also in the power electronics field as a "LLC converter" is a series type, frequency controlled, resonant converter typically having three resonant components: a resonant capacitor, a resonant inductor and a magnetizing inductor. The resonant components of the LLC converter can be selected (in relation to the operating frequency) in such a way that the converter will provide zero voltage switching (ZVS) for the switching devices connected to the power source (i.e. the primary section of the converter) and zero current switching (ZCS) for the switching devices connected to load (i.e. the secondary section of the converter). In addition, the resonant component selection can be done in a way that the ZVS and ZCS can be maintained when operating from no-load to full-load conditions. An LLC converter design procedure for meeting the above features is outlined in a paper by R. Petkov entitled "Analysis and Optimisation of a Multi-Resonant Converter Employed in a Telecom Rectifier", 21st International Telecommunication Energy Conference Intelec '99, Copenhagen, Denmark, June 1999, poster 41, as well as by Diambo Fu et al. in a paper entitled "1 MHz High Efficiency LLC Resonant Converters with Synchronous Rectifier" 38-th Annual Power Electronics Specialists Conference PESC '07, Orlando, Fla., USA, June 2007, pp. 2404-2410. The optimal selection of the resonant components typically results in magnetising inductance value being much larger than the resonant inductance value. It is noted that conventional multi-resonant converters or LLC converters typically work only in a single direction of the power transfer. The present inventors believe that by replacing the output diodes of the classical LLC converter design with synchronously controllable switches, like Mosfets for example, a circuit configuration that, when appropriately controlled, can provide bi-directional power transfer. In this circuit configuration however, the output voltage in one of the direction cannot be controlled.

Figure 8:
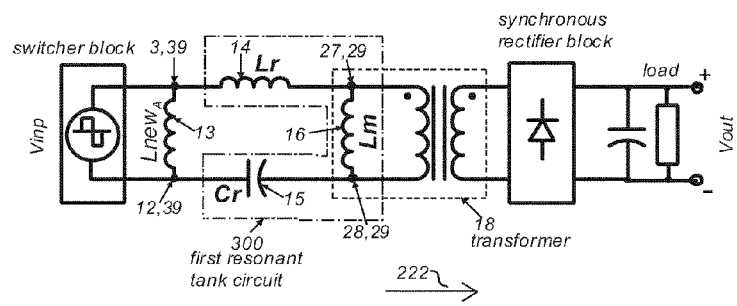
FIG. 8 shows an equivalent circuit of the example embodiment of FIG. 1 during power transfer from the primary section to the secondary section.
Figure 9:
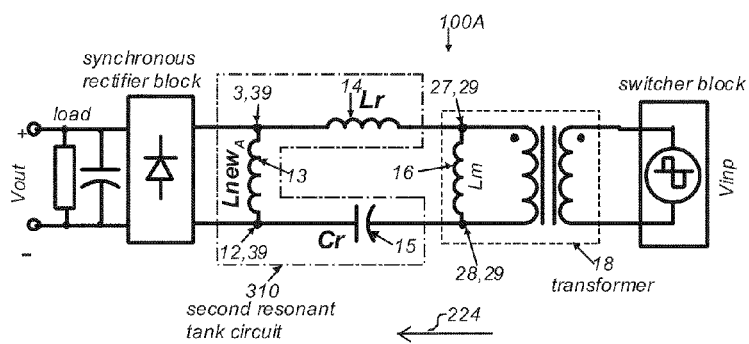
FIG. 9 shows an equivalent circuit of the example embodiment of FIG. 1 power conversion from the secondary section to the primary section.

Referring back to FIG. 1, the network of inductors 13, 14, 16 and capacitor 15 are employed in resonant network circuit 240A. It should be noted that inductors 13, 14, 16 and capacitor 15 are resonant components and that various ones of these resonant components will combine to form a same resonant configuration when exited from the terminals 3 and 12 and loaded across the terminals 27 and 28, as well as when exited from the terminals 27 and 28 and loaded across the terminals 3 and 12 (i.e. such change in the excitation and loading terminals of the resonant network circuit 240A happens when switching devices 4, 5, 6 and 7 and switching devices 21 and 22 change their control functions from a switcher to a synchronous rectifier and vice versa). This interchanging of the functions of the switcher circuit (i.e. also referred to as a chopper circuit) and the synchronous rectifier circuit when the source and the load exchange places is schematically illustrated in FIG. 8 and FIG. 9 which are simplified versions of FIG. 1 during power conversion in both directions of power transfer through bi-directional converter 100A. In FIG. 8 the power transfer is from the left hand side to the right hand side (i.e. along a first direction 222) through bi-directional converter 100A, while in FIG. 9 the power transfer is from the right hand side to left hand side (i.e. along an opposing second direction 224) through bi-directional converter 100A. In FIG. 8, power is transferred through bi-directional converter 100A during a first power transfer mode along a direction that is different than the direction that power is transferred through bi-directional converter 100A during a second power transfer mode as shown in FIG. 9. In FIG. 8 the switcher block contains the switching devices 4, 5, 6 and 7 (not shown) and anti-parallel diodes 8, 9, 10 and 11 (also not shown) from FIG. 1, while the synchronous rectifier block contains the switching devices 21 and 22 (not shown) and anti-parallel diodes 23 and 24 (also not shown) from FIG. 1. In FIG. 9 the switcher block contains the switching devices 21 and 22 (not shown) and anti-parallel diodes 23 and 24 (also not shown) from FIG. 1, while the synchronous rectifier block contains the switching devices 4, 5, 6 and 7 (not shown) and anti-parallel diodes 8, 9, 10 and 11 (also not shown) from FIG. 1.

As shown in each of FIGS. 8 and 9 the electronic circuit includes a first terminal set 29 that includes terminals 27 and 28 and a second terminal set 39 that includes terminals 3 and 12. The electronic circuit further includes a capacitor Cr and a plurality of inductors including $Lnew_A$, Lr, and Lm. In this example embodiment, a first inductor (i.e. Lm) is positioned between various terminals in the first terminal set 29 (i.e. terminals 28 and 27 in this illustrated embodiment) and a second inductor (i.e. $Lnew_A$) is positioned between various terminals in the second terminal set 39 (i.e. terminals 3 and 12 in this illustrated embodiment). In this example embodiment, a first load circuit is connected to the first terminal set 29 during the first power transfer mode and a second load circuit is connected to the second terminal set 39 during the second power transfer mode. In this example embodiment, the capacitor Cr and the inductor Lr are connected in series with the first load circuit and the first inductor (i.e. Lm) is connected in parallel with the first load circuit during the first power transfer mode. In this example embodiment, the capacitor Cr and the inductor Lr are connected in series with the second load circuit and the second inductor (i.e. $Lnew_A$) is connected in parallel with the second load circuit during the second power transfer mode. In this example embodiment, capacitor Cr and inductor Lr are connected in series with the primary side 18A of transformer 18 while inductor Lm is connected in parallel with the primary side 18A.

In this example embodiment, the resonant network between the switcher blocks and their associated synchronous rectifier blocks is of the same type for both directions of power transfer and yet it is equal to the resonant network of a conventional LLC converter. For example, in FIG. 8 the resonant components involved in the power transfer mechanism and determining the DC voltage gain characteristic (i.e. the ratio between the output voltage and the input voltage) are Lr (i.e. inductor 14), Lm (i.e. magnetizing inductor 16) and Cr (i.e. capacitor 15) with the load section connected across Lm. The inductor $Lnew_A$ (i.e. inductor 13) in FIG. 8 is connected directly across the output terminals of the switcher block and therefore does not take part in power transfer mechanism, (i.e. $Lnew_A$ does not affect the DC voltage gain (Vout/Vinp) characteristics of the resonant circuit. Accordingly, a first resonant tank circuit 300 (i.e. shown in dot-dash lines) that includes inductor 14, magnetizing inductor 16 and capacitor 15 is provided by the electronic circuit. Similarly, in FIG. 9 the resonant components involved in the power transfer mechanism are Lr (i.e. inductor 14), $Lnew_A$ (i.e. inductor 13) and Cr (i.e. capacitor 15) with the load section connected across $Lnew_A$. Inductor Lm in FIG. 9 being directly connected to the switcher block (i.e. through transformer 18) will not affect the DC voltage gain characteristics of the resonant circuit either. Accordingly, a second resonant tank circuit 310 (i.e. shown in dot-dash lines) that includes inductor 14, inductor 13 and capacitor 15 is provided by the electronic circuit. This very desirable equality of the resonant configurations in both directions of the power transfer is due to inductor $Lnew_A$ which is a resonant component that is not found in conventional LLC resonant converters. In this example embodiment, $Lnew_A$ is implemented as an external component. In this example embodiment, first resonant tank circuit 300 has the same resonant configuration as second resonant tank circuit 310. That is, the combination of inductors Lr, Lm and capacitor Cr employed by the first resonant tank circuit 300 have the same resonant configuration as the combination of inductors Lr, Lnew$_A$ and capacitor Cr employed by the second resonant tank circuit 310.

Figure 12:
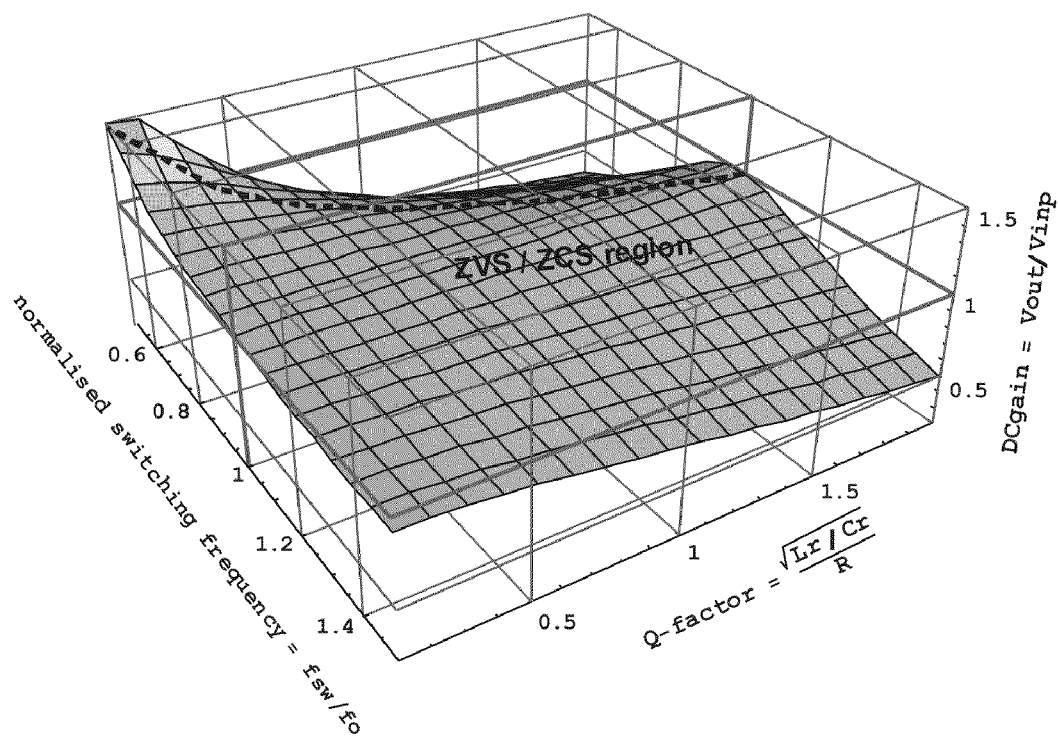
FIG. 12 shows a typical surface plot of the DC voltage gain of a LLC converter with variables that include the normalised switching frequency and the Q-factor, and with a constant ratio between the magnetising inductance and the resonant inductance.

The parameters governing resonant characteristics of an LLC converter can be represented by the following relationships:

$$fo = \frac{1}{\sqrt{LrCr}};$$

where fo is a resonant frequency $$Q = \frac{\sqrt{Lr/Cr}}{R};$$

where Q is a Q-factor $$fnorm = \frac{fsw}{fo};$$

where fnorm is a normalised switching frequency $$n_{prsec} = \frac{Lm}{Lr};$$

where $n_{prsec}$ is an inductances ratio during primary-secondary power transfer $$n_{secpr} = \frac{Lnew}{Lr};$$

where $n_{secpr}$ is an inductances ratio during secondary-primary power transfer The surface plot shown in FIG. 12 shows the DC voltage gain (Vout/Vinp) of a conventional LLC resonant converter, as well as its loss-less (ZVS/ZCS) operating area as a function of the above parameters. The broken line in FIG. 12 identifies the boundary of the ZVS/ZCS operating area of the circuit (i.e. all combinations of the 3D plot parameters lying on the surface in front of the broken line will provide loss-less switching operation with waveforms as shown in FIGS. 11a and 11b. FIG. 11a and FIG. 11b show combined current and voltage waveform plots respectively of the synchronous rectifier devices (i.e. "IsynhRect" and "VsynhRect") and the switcher devices ("Iswitch" and "Vswitch") employed in a LLC converter. These waveforms emphasize that the devices of the LLC converter operate in loss-less switching conditions (i.e. the switcher devices operate in ZVS, while the synchronous rectifier devices operate in ZCS).

There are a couple of important conclusions that can be derived from the surface plot in FIG. 12:

The DC voltage gain varies below and above the unity value, i.e. the LLC converter can perform both, step-up and step-down voltage conversion. This feature is very desirable for all bi-directional power converters, especially when a battery is connected to their terminals.

The step-up and step-down voltage conversion of the appropriately dimensioned LLC converter is accompanied with loss-less switching that is very desirable in achieving high power conversion efficiency and high power density.

Accordingly, the resonant configuration of a conventional LLC converter provides all desirable characteristics of the bi-directional converter, but only in one of the directions of power conversion. To maintain these desirable characteristics in the other direction of the power conversion one has to maintain the same resonant configuration in that direction of power conversion also. Referring back to FIG. 8 and FIG. 9 that represented simplified versions of the FIG. 1 circuit during both directions of power transfer, the addition of the inductor Lnew$_A$ advantageously provides the needed equality in both of the resonant configurations.

It follows from the equality of the resonant configurations in both directions of power transfer in the circuit of the example embodiment shown in FIG. 1, that the resonant characteristics, and specifically the DC voltage gain versus the normalised switching frequency and the Q-factor, will have similar shape to the surface plot of FIG. 12 (i.e. all desirable features of the LLC converter represented in FIG. 12 will be valid during power conversion in both directions in the circuit of FIG. 1). The inductor Lnew$_A$ in the example embodiment of the invention represented in FIG. 1 equalises the resonant configurations in both directions of power transfer resulting in step-down/step-up voltage conversion accompanied with loss-less, ZVS/ZCS operation in both directions of power conversion. The exact values of resonant characteristics in both directions of power transfer are governed by the inductance ratios Lnew$_A$/Lr and Lm/Lr (in addition to normalised switching frequency and the Q-factor). In an idealised case in which the turns ratio of transformer 18 is unity, Lnew$_A$ is equal to Lm and the input/output terminals of the circuit are equally loaded (during the bi-directional transfer), then the bi-directional converter 100A will exhibit exactly the same DC-voltage gain and ZVS/ZSC characteristics in both directions of power transfer. It is noted that in some example embodiments of the invention, various ones of the corresponding resonant components employed to establish equal resonant configurations in both directions of power transfer have different values. In some example embodiments of the invention, a value of a resonant component employed in a first resonant tank circuit is different from a value of a corresponding resonant component employed by a second resonant tank circuit that has the same resonant configuration as the first resonant tank circuit. In other example embodiments of the invention, resonant circuits having different resonant configurations are employed in each direction of power transfer FIG. 10a shows the waveform of the currents (i.e. ILnew$_A$, ILm) through Lnew$_A$ and Lm inductors of FIG. 8 and FIG. 9. FIG. 10b shows the waveforms (i.e. IsynhRect1 and IsynhRect2) of the current through the synchronous rectifier devices of FIG. 8 and FIG. 9. FIG. 10b shows that at the switching instances t1 and t2 during which one of the synchronous rectifier devices turns off and the opposite synchronous rectifier device turns on the currents through these devices is equal to zero, which results in zero switching loss (i.e. zero current switching (ZCS)). FIG. 10c shows the waveforms of the currents (i.e. Iswitch1 and Iswitch2) through the switcher devices of FIG. 8 and FIG. 9 and one can see that just after the switching instances t1 and t2 these currents are negative, i.e. they flow not through device channel but through the anti-parallel diodes of the switcher devices. It follows that the voltage drop across the switcher devices at these instances is very small and equal to the voltage drop across the junction of a forward biased diode (i.e. typically less than 1V). A very small switching loss (i.e. zero voltage switching (ZVS) results.

Referring back to FIGS. 8 and 9, it is to be noted that costs are advantageously reduced in this example embodiment since the first resonant tank circuit 300 shares at least two common resonant components (i.e. Lr connected in series with Cr in this illustrated embodiment) with the second resonant tank circuit 310. In this illustrated embodiment, each of the first and second resonant tank circuits 300 and 310 include only a single different component. Specifically, in this illustrated embodiment, the first resonant tank circuit 300 include a first resonant component (i.e. Lm) that is different than a second resonant component (i.e. $Lnew_A$) employed by the second resonant tank circuit 310. In various example embodiments of the present invention, a plurality of resonant tank circuits is employed, each of the resonant tank circuits including at least one capacitor and at least one inductor that are connected in series.

Figure 2:
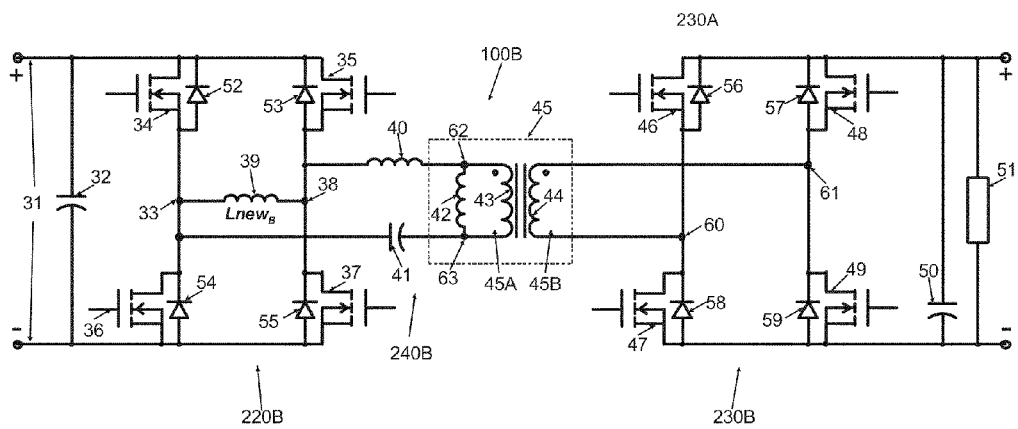
FIG. 2 shows a schematic circuit of an example embodiment of the present invention employing a full-bridge primary section and a full-bridge secondary section.

A bi-directional converter 100B as per another example embodiment of present invention is shown in FIG. 2. This circuit configuration is suitable for bi-directional power conversion of DC voltages with higher amplitudes. In the case of power transfer from the left hand side to the right hand side of the circuitry shown in FIG. 2, a full-bridge switcher circuit 220B that includes controlled switching devices 34, 35, 36 and 37 which include embedded, or external, anti-parallel diodes 52, 53, 54 and 55 is connected to a DC voltage source 31. A filter capacitor 32 is connected in parallel to the DC voltage source 31 to filter switching frequency ripple. Switching devices 34, 35, 36 and 37 are turned on and off with approximately 50% duty cycle width and their switching frequency is controlled, so that full-bridge switcher circuit 220B produces square-wave voltage with 50% duty cycle and variable frequency at terminals 33 and 38. An inductor 39 is connected across terminals 33 and 38. A series network that includes inductor 40, capacitor 41 and magnetizing inductor 42 is connected to terminals 33 and 38. Magnetising inductor 42 is connected in parallel with the primary winding 43 located on the primary side 45A of transformer 45. In this example embodiment, magnetizing inductor 42 is an embedded magnetising inductor of transformer 45. The secondary winding 44 located on the secondary side 45B of transformer 45 is connected to terminals 60 and 61 of a full-bridge rectifier circuit 230B that includes controllable switching devices 46, 47, 48 and 49 that include embedded or external anti-parallel diodes 56, 57, 58 and 59. In this example embodiment, switching devices 46, 47, 48 and 49 are controlled in a synchronous rectification manner with approximately 50% duty cycle control pulses width, so they rectify the square-wave voltage across terminals 60 and 61 produced by the secondary winding 44. A common cathode point of anti-parallel diodes 56 and 57 is connected to the positive terminal of the load impedance 51, while a common anode point of diodes 58 and 59 is connected to the negative terminal of the load impedance 51. A filter capacitor 50 is connected across the load impedance 51 to filter out switching ripple. In this example embodiment, full-bridge rectifier circuit 230B is employed as a full-bridge synchronous rectifier circuit.

In case of power transfer from the right hand side to left hand side of the circuitry shown in FIG. 2, the power source and the load impedance swap their places (i.e. load impedance 51 becomes a DC voltage source, while DC voltage source 31 becomes a load impedance). In addition, the switching devices 46, 47, 48 and 49 become a full-bridge switcher circuit with controlled switching frequency and approximately 50% duty cycle width that produces square-wave voltage with variable frequency across terminals 60 and 61 of the secondary winding 44 of transformer 45. In addition, the switching devices 34, 35, 36 and 37 become a full-bridge synchronously controlled rectifier circuit with approximately 50% duty cycle control pulses width that rectify the square wave voltage on terminals 33 and 38 produced by the full-bridge switcher circuit. Similarly to the example embodiment of FIG. 1, a resonant network circuit 240B that includes inductors 39, 40, 42 and capacitor 41 forms the same resonant configuration when excited from terminals 33 and 38 and loaded across terminals 62 and 63, as well as when excited from terminals 62 and 63 and loaded across terminals 33 and 38. This change in the excitation and loading terminals of the resonant network circuit 204B can happen when switching devices 34, 35, 36 and 37 and switching devices 46, 47, 48 and 49 change their control functions from a switcher to a synchronous rectifier and vice versa. It is noted that the loading/excitation across terminals 62 and 63 is firmly linked to loading/excitation across terminals 60 and 61 by the turns ratio of the primary winding 43 and secondary winding 44 of transformer 45. In this example embodiment, inductor 39 is referred to $Lnew_B$ which allows bi-directional converter 100B to have the same resonant configurations in both directions of power transfer.

Figure 3:
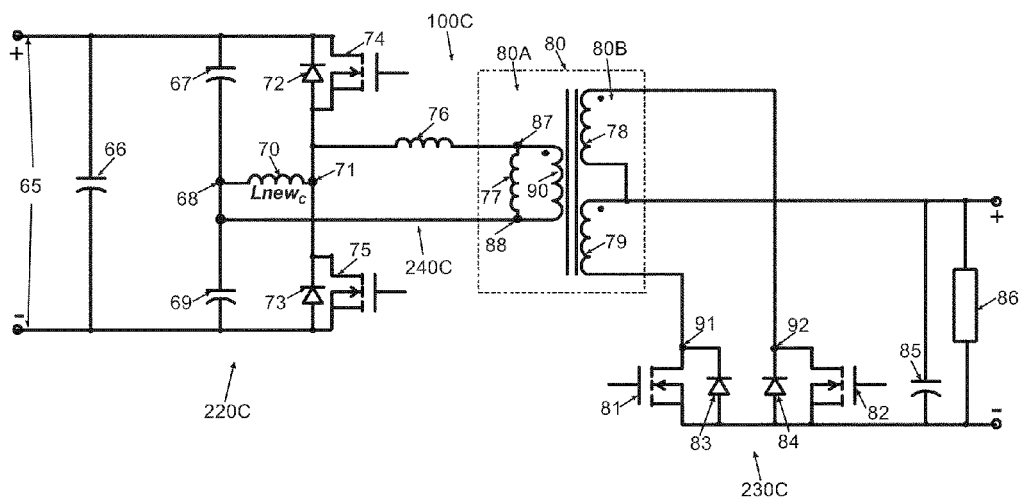
FIG. 3 shows a schematic circuit of an example embodiment of the present invention employing a half-bridge primary section and a push-pull secondary section.

A bi-directional converter 100C as per another example embodiment of present invention is shown in FIG. 3. This circuit configuration is suitable for bi-directional power conversion of DC voltages with medium to low amplitudes. In case of power transfer from the left hand side to the right hand side of the circuitry in FIG. 3, a half-bridge switcher circuit 220C that includes controlled switching devices 74 and 75 which include embedded, or external, anti-parallel diodes 72 and 73 is connected to DC voltage source 65. A filter capacitor 66 is connected in parallel to the DC voltage source 65 to filter switching frequency ripple. Two resonant capacitors 67 and 69 are connected in series with a common point located at terminal 68 and their free ends are connected to the positive and the negative terminals of the DC voltage source 65. Switching devices 74 and 75 are turned on and off with approximately 50% duty cycle width and their switching frequency is controlled, so that half-bridge switcher circuit 220C produces square-wave voltage with 50% duty cycle and variable frequency on terminals 68 and 71. An inductor 70 is connected across terminals 68 and 71. A series network that includes inductor 76 and magnetizing inductor 77 which is an embedded magnetising inductor of a transformer 80 in this example embodiment is connected to terminals 68 and 71. Magnetizing inductor 77 is also connected in parallel with the primary winding 90 located on the primary side 80A of transformer 80. The secondary windings 78 and 79 located on the secondary side 80B of transformer 80 have equal number of turns and are connected in centre-tap configuration in which the centre-tap terminal is connected to the positive terminal of a load impedance 86, while the free ends of the secondary windings are connected to controlled switching devices 81 and 82 that include embedded, or external, anti-parallel diodes 83 and 84. The switching devices 81 and 82 are controlled in a synchronous rectification manner with approximately 50% duty cycle control pulses width, so they rectify the square-wave voltage produced by the secondary windings 78 and 79. The common point of switching devices 81 and 82 is connected to the negative terminal of the load impedance 86. A filter capacitor 85 is connected in parallel to the load impedance 86. In this example embodiment switching devices 81 and 82 are arranged in a push-pull rectifier circuit 230C. In this example embodiment, push-pull rectifier circuit 230C is employed as a push-pull synchronous rectifier circuit.

In the case of power transfer from the right hand side to left hand side of the circuitry in FIG. 3, the power source and the load swap their places, (i.e. load impedance 86 becomes a DC voltage source, while DC voltage source 65 becomes a load). In addition, switching devices 81 and 82 become a push-pull controlled switcher with controlled switching frequency and approximately 50% duty cycle width that produces square-wave voltage with variable frequency across terminals 87 and 88 located at the primary winding 90 of transformer 80. Furthermore, the switching devices 74 and 75 become a synchronously controlled rectifier with approximately 50% duty cycle control pulses width that rectifies the square wave voltage on terminals 68 and 71 produced by the push-pull switcher created by switching devices 81 and 82. It can be noted that the resonant network circuit 240C that includes inductors 70, 76, 77 and resonant capacitors 67 and 69 will form the same resonant configuration when excited from terminals 68 and 71 and loaded across terminals 87 and 88, as well as when exited from terminals 87, 88 and loaded across terminals 68 and 71. This change in the excitation and loading terminals of the resonant network of capacitors 67 and 69, and inductors 70, 76 and 77 happens when switching devices 74, 75, 81 and 82 change their control functions from a switcher to a synchronous rectifier and vice versa. It is noted that loading/excitation across terminals 87 and 88 is firmly linked to loading/excitation across terminals 91 and 92 by the turns ratio of the primary winding 90 and secondary windings 78 and 79 of transformer 80. In this example embodiment, inductor 70 is referred to $Lnew_C$ which allows bi-directional converter 100C to have the resonant configurations in both directions of power transfer.

Figure 4:
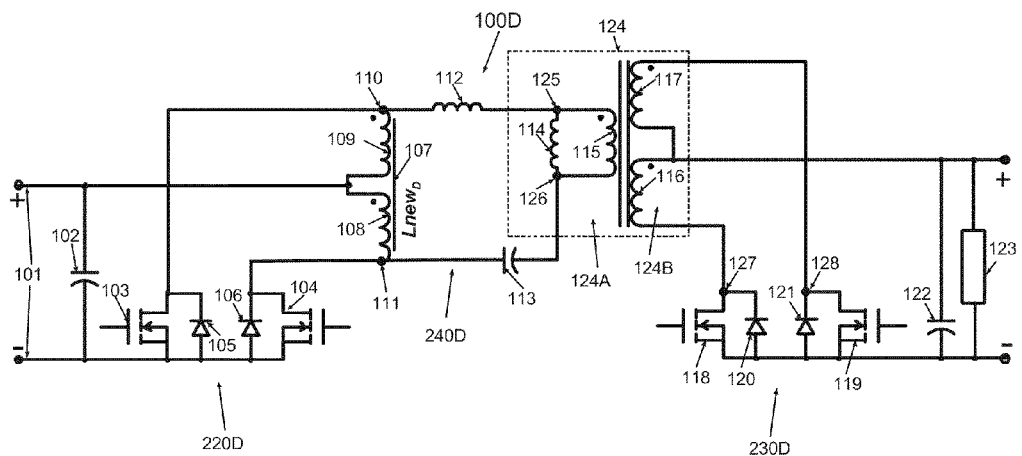
FIG. 4 shows a schematic circuit of an example embodiment of the present invention employing a push-pull primary section and a push-pull secondary section.

A bi-directional converter 100D as per another example embodiment of present invention is shown in FIG. 4. This circuit configuration is suitable for bi-directional power conversion of DC voltages with lower amplitudes. In case of power transfer from the left hand side to the right hand side of the circuitry in FIG. 4, a push-pull switcher circuit 220D that includes controlled switching devices 103 and 104 which include embedded, or external, anti-parallel diodes 105 and 106 is connected to a DC voltage source 101. A filter capacitor 102 is connected in parallel to the DC voltage source 101 to filter switching frequency ripple. Switching devices 103 and 104 are turned on and off with approximately 50% duty cycle width and their switching frequency is controlled to produce square-wave voltage with 50% duty cycle and variable frequency on terminals 110 and 111. An inductor 107 having two, connected in series and magnetically coupled sections with equal number of turns 108 and 109 is connected across terminals 110 and 111. A series network that includes inductor 112, capacitor 113 and magnetising inductor 114 is also connected to terminals 110 and 111. In this example embodiment, magnetising inductor 114 is an embedded inductor of transformer 124. Magnetising inductor 114 is also connected in parallel with the primary winding 115 located on the primary side 124A of transformer 124. The secondary windings 116 and 117 located on the secondary side 124B of transformer 124 have equal number of turns and are connected in centre-tap configuration in which the centre-tap terminal is connected to the positive terminal of a load impedance 123, while the free ends of the secondary windings 116 and 117 are connected to controlled switching devices 118 and 119 that include embedded, or external, anti-parallel diodes 120 and 121. The switching devices 118 and 119 are controlled in a synchronous rectification manner with approximately 50% duty cycle control pulses width, so they rectify the square-wave voltage produced by the secondary windings 116 and 117. A common point of switching devices 118 and 119 is connected to the negative terminal of the load impedance 123. A filter capacitor 122 is connected in parallel to the load impedance 123. In this example embodiment switching devices 118 and 119 are arranged in a push-pull rectifier circuit 230D. In this example embodiment, push-pull rectifier circuit 230D is employed as push-pull synchronous rectifier circuit.

In case of power transfer from the right hand side to left hand side of the circuitry in FIG. 4, the power source and the load swap their places (i.e. load impedance 123 becomes a DC voltage source, while DC voltage source 101 becomes a load). In this case the switching devices 118 and 119 become a push-pull controlled switcher with controlled switching frequency and approximately 50% duty cycle width that produces square-wave voltage with variable frequency across terminals 125 and 126 located at the primary winding 115 of transformer 124. Furthermore, the switching devices 103 and 104 become a synchronously controlled rectifier with approximately 50% duty cycle control pulses width that rectifies the square wave voltage on terminals 110 and 111 produced by the push-pull switcher created by switching devices 118 and 119. It can be noted that the series resonant network circuit 240D that include inductors 107, 112 and 114 and the resonant capacitor 113 will form the same resonant configuration when excited from terminals 110 and 111 and loaded across terminals 125 and 126, as well as when excited from terminals 125 and 126 and loaded across terminals 110 and 111. This change in the excitation and loading terminals of the resonant network circuit 240D can happen when switching devices 103, 104, 118, and 119 change their control functions from a switcher to a synchronous rectifier and vice versa. It is noted that loading/excitation across terminals 125 and 126 is firmly linked to loading/excitation across terminals 127 and 128 by the turns ratio of the primary winding 115 and secondary windings 116 and 117 of transformer 124. In this example embodiment, inductor 107 is referred to $Lnew_D$ which allows bi-directional converter 100D to have the resonant configurations in both directions of power transfer.

Figure 5:
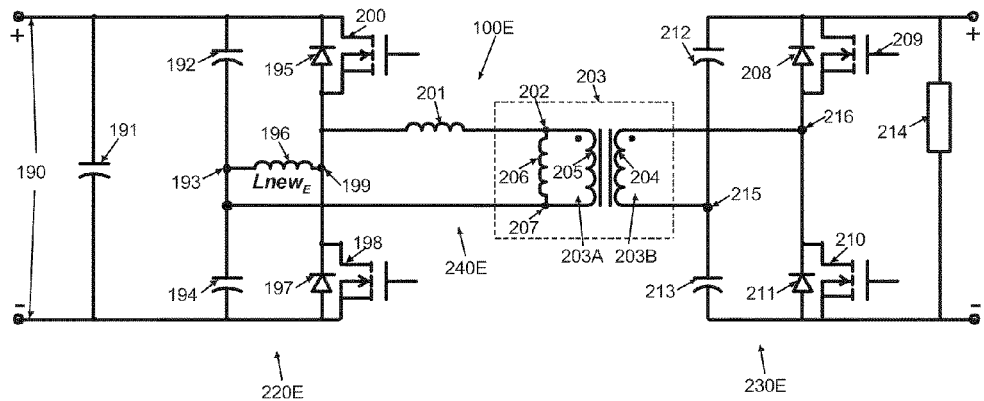
FIG. 5 shows a schematic circuit of an example embodiment of the present invention employing a half-bridge primary section and a half-bridge secondary section.

A bi-directional converter 100E as per another example embodiment of present invention is shown in FIG. 5. This circuit configuration is suitable for bi-directional power conversion of DC voltages with medium amplitudes. In case of power transfer from the left hand side to the right hand side of the circuitry in FIG. 5, a half-bridge switcher circuit 220E that includes controlled switching devices 198 and 200 which include embedded, or external, anti-parallel diodes 197 and 195 is connected to a DC voltage source 190. A filter capacitor 191 is connected in parallel to the DC voltage source 190 to filter switching frequency ripple. Two resonant capacitors 192 and 194 are connected in series with a common point at terminal 193 and their free ends are connected to the positive and negative terminals of the DC voltage source 190. The switching devices 198 and 200 are turned on and off with approximately a 50% duty cycle width and their switching frequency is controlled, so that half-bridge switcher circuit 220E produces square-wave voltage with 50% duty cycle and variable frequency on terminals 193 and 199. An inductor 196 is connected across terminals 193 and 199. A series network that includes inductor 201 and magnetizing inductor 206 is also connected to terminals 193 and 199. In this example embodiment, magnetizing inductor 206 is an embedded magnetising inductor of a transformer 203. Magnetizing inductor 206 is connected in parallel with the primary winding 205 located on the primary side 203A of transformer 203. The secondary winding 204 located on the secondary side 203B of transformer 203 is connected to terminals 215 and 216 which are input terminals of a half-bridge rectifier circuit 230E that includes controllable switching devices 209 and 210 which include embedded or external anti-parallel diodes 208 and 211. The switching devices 209 and 210 are connected in series with a common point located at terminal 216, while their free ends are connected to the positive and negative terminals of the load impedance 214. Two filter capacitors 212 and 213 are also connected in series with a common point at terminal 215, while their free ends are connected to the positive and negative terminals of the load impedance 214. The switching devices 209 and 210 are controlled in a synchronous rectification manner with approximately 50% duty cycle control pulses width, so they rectify the square-wave voltage across terminals 215 and 216 produced by the secondary winding 204. In this example embodiment, half-bridge rectifier circuit 230E is employed as a half-bridge synchronous rectifier circuit.

In case of power transfer from the right hand side to left hand side of the circuitry in FIG. 5, the power source and the load impedance swap their places (i.e. load impedance 214 becomes a DC voltage source, while DC voltage source 190 becomes a load). In addition, the switching devices 209 and 210 become a half-bridge switcher circuit with controlled switching frequency and approximately 50% duty cycle width that produces square-wave voltage with variable frequency across terminals 215 while the switching devices 198 and 200 become a half-bridge synchronously controlled rectifier with approximately 50% duty cycle control pulses width that rectify the square wave voltage on terminals 193 and 199 produced by the half-bridge switcher circuit. It is noted that a resonant network circuit 240E that includes inductors 196, 201, 206 and capacitors 192, 194 forms the same resonant configuration when excited from terminals 193 and 199 and loaded across terminals 202 and 207, as well as when excited from terminals 202 and 207 and loaded across terminals 193 and 199. This change in the excitation and loading terminals of the resonant network circuit 240E can happen when switching devices 198, 200, 209 and 210 change their control functions from a switcher to a synchronous rectifier and vice versa. It is noted that the loading/excitation across terminals 202 and 207 is firmly linked to loading/excitation across terminals 215 and 216 by the turns ratio of the primary winding 205 and secondary winding 204 of transformer 203. In this example embodiment, inductor 196 is referred to Lnew$_E$ which causes bi-directional converter 100E to have the resonant configurations in both directions of power transfer.

Figure 6:
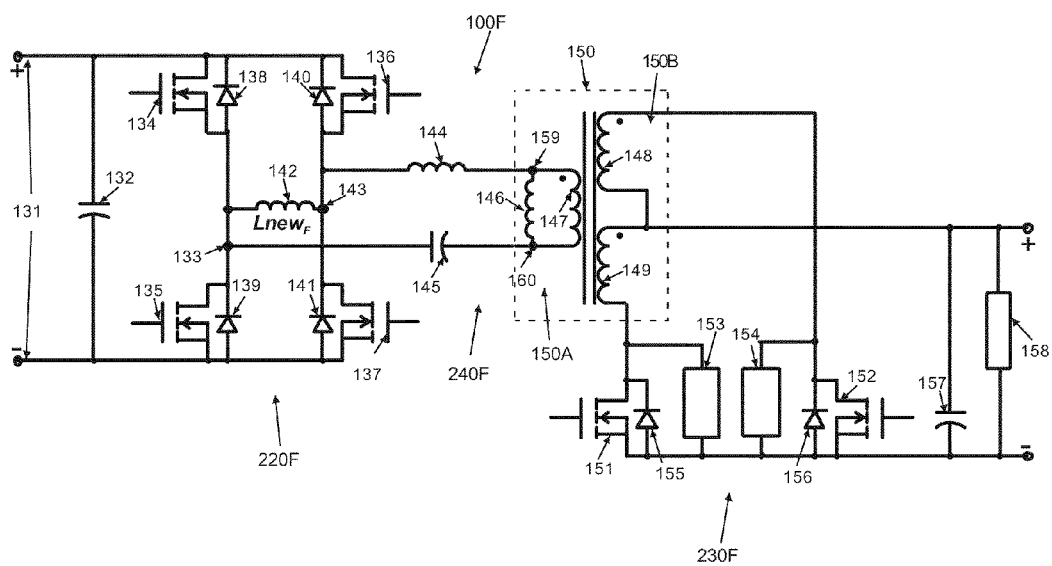
FIG. 6 shows a schematic circuit of an example embodiment of the present invention employing a full-bridge primary section and a push-pull secondary section in which the push-pull switching devices are equipped with individual non-dissipative or dissipative snubbers.

A bi-directional converter 100F as per another example embodiment of present invention is shown in FIG. 6. The FIG. 6 schematic and principle of operation is similar to that described for the example embodiment of FIG. 1. In the case of power transfer from the left hand side to the right hand side of the circuitry in FIG. 6, a full-bridge switcher circuit 220F containing controlled switching devices 134, 135, 136 and 137 that include embedded, or external, anti-parallel diodes 138, 139, 140 and 141 is connected to a DC voltage source 131. A filter capacitor 132 is connected in parallel to the DC voltage source 131 to filter out the switching ripple. Switching devices 134, 135, 136 and 137 are turned on and off with approximately 50% duty cycle width and their switching frequency is controlled, so that full-bridge switcher circuit 220F produces square-wave voltage waveform with 50% duty cycle and variable frequency on terminals 133 and 143. An inductor 142 is connected across the terminals 133 and 143. A series network that includes inductor 144, capacitor 145 and magnetising inductor 146 is connected to terminals 133 and 143. Magnetising inductor 146 is connected in parallel with the primary winding 147 located on the primary side 150A of transformer 150. In this example embodiment, magnetising inductor 146 is embedded in the magnetic structure of transformer 150. The secondary windings 148 and 149 located on the secondary side 150B of transformer 150 include equal number of winding turns and are connected in centre-tap configuration in which the centre-tap terminal is connected to the positive terminal of a load impedance 158, while the ends of the secondary windings 148 and 149 are connected to a push-pull rectifier circuit 230F that includes controlled switching devices 151 and 152 which include embedded, or external, anti-parallel diodes 155 and 156. The switching devices 151 and 152 are controlled in a synchronous rectification manner with approximately 50% duty cycle control pulses width, so they rectify the square-wave voltage produced by the secondary windings. A common point of switching devices 151 and 152, and anti-parallel diodes 155 and 156 is connected to the negative terminal of the load impedance 158. A filter capacitor 157 is connected in parallel to load impedance 158. In this example embodiment, push-pull rectifier circuit 230F is employed as a push-pull synchronous rectifier circuit.

One difference between the example embodiment of FIG. 1 and this illustrated embodiment includes the presence of two dissipative or non-dissipative snubber networks 153 and 154 connected in parallel to the switching devices switches 151 and 152. In various applications switching devices 151 and 152 are equipped with parallel snubbers (or voltage clamps) that clamp voltage spikes across switching devices 151 and 152 that can be generated by leakage inductances of transformer 150. Although the secondary windings 148 and 149 located on the secondary side 150B of the centre-tap transformer 150 are typically designed to have very strong magnetic coupling, a small leakage inductance is usually present in secondary windings 148 and 149. This inductance can cause voltage spikes across the switching devices 151 and 152 as they undergo a "turn-off" cycle. The amplitude of these voltage spikes is typically a function of the leakage inductance value, as well as the rate of change of the turn-off current and sometimes it can be dangerously high for the safe operation of switching devices 151 and 152. The schematics of these dissipative, or non-dissipative, snubbers are of a large variety, and can vary from those illustrated in FIG. 6.

Similarly to the example embodiment of FIG. 1, a resonant network circuit 240F that includes inductors 142, 144, 146 and capacitor 145 forms the same resonant configuration when excited from terminals 133 and 143 and loaded across terminals 159 and 160, as well as when excited from terminals 159 and 160 and loaded across terminals 133 and 143. This change in the excitation and loading terminals of the resonant network circuit 240F can happen when switching devices 134, 135, 140 and 141 and switching devices 151 and 152 change their control functions from a switcher to a synchronous rectifier and vice versa. In this example embodiment, inductor 142 is referred to Lnew$_F$ which allows bi-directional converter 100F to have the resonant configurations in both directions of power transfer.

Figure 7:
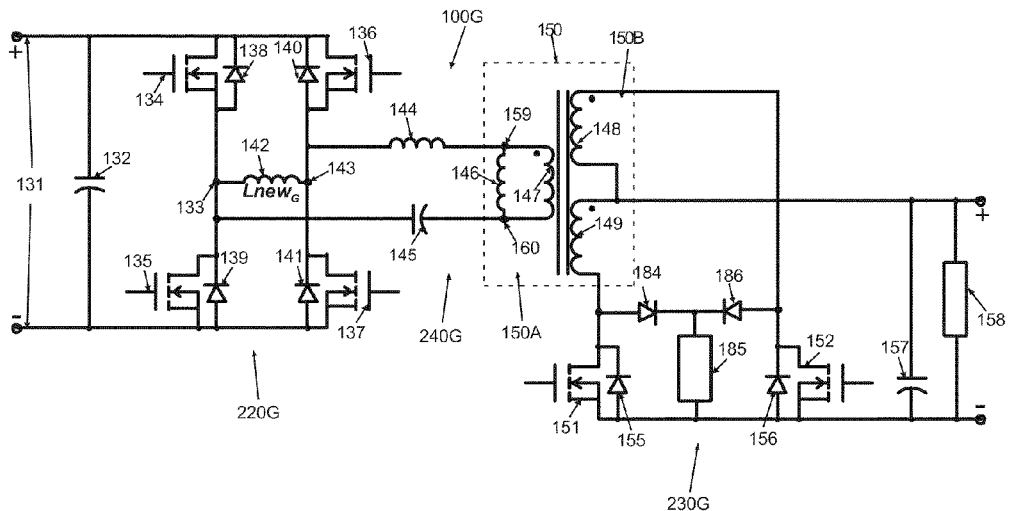
FIG. 7 shows a schematic circuit of an example embodiment of the present invention employing a full-bridge primary section and a push-pull secondary section in which the push-pull switching devices are equipped with a common non-dissipative or dissipative snubber connected to the switching devices through two common cathode diodes.

A bi-directional converter 100G as per another example embodiment of present invention is shown in FIG. 7. Its schematic and principle of operation is similar to the example embodiment of FIG. 6 and similar components are accordingly identified using identical part numbers. One difference between the two embodiments is that the two dissipative, or non-dissipative snubbers (or voltage clamps) 153 and 157 employed by the push-pull rectifier circuit 230F of FIG. 6 are replaced in FIG. 7 with a single dissipative or non-dissipative snubber (or voltage clamp) 185 employed by push-pull rectifier circuit 230G. Snubber 185 is connected in parallel to the switching devices 151 and 152 via diodes 184 and 186.

Diodes 184 and 186 have a common cathode point connected to the top terminal of the snubber 185, while the anodes of diodes 184 and 186 are connected to the top terminals of switching devices 151 and 152, respectively. The bottom terminals of switching devices 151 and 152 are connected to the bottom terminal of the snubber 185 and to the negative terminal of the load 158. In this example embodiment, power is transferred bi-directionally between full-bridge switcher circuit 220G and push-pull rectifier circuit 230G via resonant network circuit 240G in a manner similar to that described in other example embodiments. Inductor 142 which is referred to as $Lnew_G$ allows bi-directional converter 100G to have resonant configurations in both directions of power transfer.

Various embodiments of the invention have now been described in detail. Without limitation, the various embodiments of the invention described can be combined to provide other example embodiments. The scope of the invention is to be construed in accordance with the substance defined by the following claims. As will be apparent to those skilled in the art in light of the foregoing disclosure, many alterations and modifications to the above-described best mode are possible without departing from the spirit or scope thereof. For example, certain modifications, permutations, additions and sub-combinations of the features described herein will be apparent to those skilled in the art. It is intended that the following appended claims and the claims hereafter introduced should be interpreted broadly so as to encompass all such modifications, permutations, additions and sub-combinations as are consistent with the language of the claims, broadly construed.

PARTS LIST

| | |
|---|---|
| 1 | DC voltage source |
| 2 | filter capacitor |
| 3 | terminal |
| 4 | switching device |
| 5 | switching device |
| 6 | switching device |
| 7 | switching device |
| 8 | anti-parallel diode |
| 9 | anti-parallel diode |
| 10 | anti-parallel diode |
| 11 | anti-parallel diode |
| 12 | terminal |
| 13 | inductor |
| 14 | inductor |
| 15 | capacitor |
| 16 | magnetizing inductor |
| 17 | primary winding |
| 18 | transformer |
| 18A | primary side |
| 18B | secondary side |
| 19 | secondary winding |
| 20 | secondary winding |
| 21 | switching device |
| 22 | switching device |
| 23 | anti-parallel diode |
| 24 | anti-parallel diode |
| 25 | filter capacitor |
| 26 | load impedance |
| 27 | terminal |
| 28 | terminal |
| 29 | first terminal set |
| 31 | DC voltage source |
| 32 | filter capacitor |
| 33 | terminal |
| 34 | switching device |
| 35 | switching device |
| 36 | switching device |
| 37 | switching device |
| 38 | terminal |
| 39 | second terminal set |
| 40 | inductor |
| 41 | capacitor |
| 42 | magnetizing inductor |
| 43 | primary winding |
| 44 | secondary winding |
| 45 | transformer |
| 45A | primary side |
| 45B | secondary side |
| 46 | switching device |
| 47 | switching device |
| 48 | switching device |
| 49 | switching device |
| 50 | filter capacitor |
| 51 | load impedance |
| 52 | anti-parallel diode |
| 53 | anti-parallel diode |
| 54 | anti-parallel diode |
| 55 | anti-parallel diode |
| 56 | anti-parallel diode |
| 57 | anti-parallel diode |
| 58 | anti-parallel diode |
| 59 | anti-parallel diode |
| 60 | terminal |
| 61 | terminal |
| 62 | terminal |
| 63 | terminal |
| 65 | DC voltage source |
| 66 | filter capacitor |
| 67 | capacitor |
| 68 | terminal |
| 69 | capacitor |
| 70 | inductor |
| 71 | terminal |
| 72 | anti-parallel diode |
| 73 | anti-parallel diode |
| 74 | switching device |
| 75 | switching device |
| 76 | inductor |
| 77 | magnetizing inductor |
| 78 | secondary winding |
| 79 | secondary winding |
| 80 | transformer |
| 80A | primary side |
| 80B | secondary side |
| 81 | switching device |
| 82 | switching device |
| 83 | anti-parallel diode |
| 84 | anti-parallel diode |
| 85 | filter capacitor |
| 86 | load impedance |
| 87 | terminal |
| 88 | terminal |
| 90 | primary winding |
| 91 | terminal |
| 92 | terminal |
| 100A | bi-directional converter |
| 100B | bi-directional converter |
| 100C | bi-directional converter |
| 100D | bi-directional converter |
| 100E | bi-directional converter |
| 100F | bi-directional converter |
| 100G | bi-directional converter |
| 101 | DC voltage source |
| 103 | switching device |
| 104 | switching device |
| 105 | anti-parallel diode |
| 106 | anti-parallel diode |
| 107 | inductor |
| 108 | turns |
| 109 | turns |
| 110 | terminal |
| 111 | terminal |
| 112 | inductor |
| 113 | capacitor |
| 114 | magnetizing inductor |
| 115 | primary winding |
| 116 | secondary winding |

PARTS LIST

| | |
|---|---|
| 117 | secondary winding |
| 118 | switching device |
| 119 | switching device |
| 120 | anti-parallel diode |
| 121 | anti-parallel diode |
| 122 | filter capacitor |
| 123 | load impedance |
| 124 | transformer |
| 124A | primary side |
| 124B | secondary side |
| 131 | DC voltage source |
| 132 | filter capacitor |
| 133 | terminal |
| 134 | switching device |
| 135 | switching device |
| 136 | switching device |
| 137 | switching device |
| 138 | anti-parallel diode |
| 139 | anti-parallel diode |
| 140 | anti-parallel diode |
| 141 | anti-parallel diode |
| 142 | inductor |
| 143 | terminal |
| 144 | inductor |
| 145 | capacitor |
| 146 | magnetizing inductor |
| 147 | primary winding |
| 148 | secondary winding |
| 149 | secondary winding |
| 150 | transformer |
| 150A | primary side |
| 150B | secondary side |
| 151 | switching device |
| 152 | switching device |
| 153 | snubber network |
| 154 | snubber network |
| 157 | filter capacitor |
| 158 | load impedance |
| 159 | terminal |
| 160 | terminal |
| 171 | inductor |
| 184 | diode |
| 185 | snubber |
| 186 | diode |
| 190 | DC voltage source |
| 191 | filter capacitor |
| 192 | resonant capacitor |
| 193 | terminal |
| 194 | resonant capacitor |
| 195 | anti-parallel diode |
| 197 | anti-parallel diode |
| 198 | switching device |
| 199 | terminal |
| 200 | switching device |
| 201 | inductor |
| 203 | transformer |
| 203A | primary side |
| 203B | secondary side |
| 204 | secondary winding |
| 205 | primary winding |
| 206 | magnetizing inductor |
| 207 | terminal |
| 208 | anti-parallel diode |
| 209 | switching device |
| 210 | switching device |
| 211 | anti-parallel diode |
| 212 | filter capacitor |
| 213 | filter capacitor |
| 214 | load impedance |
| 215 | terminal |
| 216 | terminal |
| 220A | full-bridge switcher circuit |
| 220B | full-bridge switcher circuit |
| 220C | half-bridge switcher circuit |
| 220D | push-pull switcher circuit |
| 220E | half-bridge switcher circuit |
| 220F | full-bridge switcher circuit |
| 220G | full-bridge switcher circuit |
| 222 | first direction |
| 224 | second direction |
| 230A | push-pull rectifier circuit |
| 230B | full-bridge rectifier circuit |
| 230C | push-pull rectifier circuit |
| 230D | push-pull rectifier circuit |
| 230E | half-bridge rectifier circuit |
| 230F | push-pull rectifier circuit |
| 230G | push-pull rectifier circuit |
| 240A | resonant network circuit |
| 240B | resonant network circuit |
| 240C | resonant network circuit |
| 240D | resonant network circuit |
| 240E | resonant network circuit |
| 240F | resonant network circuit |
| 240G | resonant network circuit |
| 300 | first resonant tank circuit |
| 310 | second resonant tank circuit |

The invention claimed is:

1. A bi-directional DC to DC converter comprising:
a first resonant tank circuit employed during power transfer along a first direction through the bi-directional DC to DC converter; and
a second resonant tank circuit employed during power transfer along a second direction through the bi-directional DC to DC converter, wherein the second direction opposes the first direction and wherein the first resonant tank circuit shares at least two common resonant components with the second resonant tank circuit, the at least two common resonant components comprise a capacitor connected in series with an inductor, and the first resonant tank circuit further comprises a first resonant component that is different from a second resonant component comprised by the second resonant tank circuit, the first resonant component comprises a first inductor connected in series with the at least two common resonant components and the second resonant component comprises a second inductor connected in series with the at least two common resonant components.

2. The bi-directional DC to DC converter of claim 1, wherein the at least two common resonant components are connected in series with a first load circuit and the first inductor is connected in parallel with the first load circuit during the power transfer along the first direction, and the at least two common resonant components are connected in series with a second load circuit and the second inductor is connected in parallel with the second load circuit during the power transfer along the second direction.

3. The bi-directional DC to DC converter of claim 1, comprising a transformer, the transformer comprising a primary side connected in series with the at least two common resonant components and connected in parallel with the first inductor.

4. The bi-directional DC to DC converter of claim 3, wherein the at least two common resonant components are connected in series with a full-bridge switcher circuit and the second inductor is connected in parallel with the full-bridge switcher circuit.

5. The bi-directional DC to DC converter of claim 4, wherein the transformer comprises a secondary side connected to one of a full-bridge synchronous rectifier circuit, a half-bridge synchronous rectifier circuit and a push-pull synchronous rectifier circuit.

6. The bi-directional DC to DC converter of claim 3, wherein the at least two common resonant components are connected in series with a half-bridge switcher circuit and the second inductor is connected in parallel with the half-bridge switcher circuit.

7. The bi-directional DC to DC converter of claim 6, wherein the transformer comprises a secondary side connected to one of a full-bridge synchronous rectifier circuit, a half-bridge synchronous rectifier circuit and a push-pull synchronous rectifier circuit.

8. The bi-directional DC to DC converter of claim 3, wherein the at least two common resonant components are connected in series with a push-pull switcher circuit and the second inductor is connected in parallel with the push-pull switcher circuit.

9. The bi-directional DC to DC converter of claim 8, wherein the transformer comprises a secondary side connected to one of a full-bridge synchronous rectifier circuit, a half-bridge synchronous rectifier circuit and a push-pull synchronous rectifier circuit.

10. The bi-directional DC to DC converter of claim 1, wherein the first resonant tank circuit and the second resonant tank circuit comprise the same resonant configuration.

11. A bi-directional DC to DC converter comprising:
an electronic circuit adapted to provide a first resonant tank circuit during a first power transfer mode through the bi-directional DC to DC converter and a second resonant tank circuit during a second power transfer mode through the bi-directional DC to DC converter, wherein the electronic circuit comprises a first terminal set, a second terminal set, at least one capacitor and a plurality of inductors, the plurality of inductors comprising a first inductor positioned between at least two terminals in the first terminal set and a second inductor positioned between at least two terminals in the second terminal set, wherein a first load circuit is connected to the first terminal set during the first power transfer mode and a second load circuit is connected to the second terminal set during the second power transfer mode, and wherein the at least one capacitor and at least one inductor of the plurality of inductors are connected in series with the first load circuit and the first inductor is connected in parallel with the first load circuit during the first power transfer mode, and the at least one capacitor and the at least one inductor of the plurality of inductors are connected in series with the second load circuit and the second inductor is connected in parallel with the second load circuit during the second power transfer mode.

12. The bi-directional DC to DC converter of claim 11, comprising a transformer, the transformer comprising a primary side connected to the first terminal set, wherein the at least one capacitor and at least one inductor of the plurality of inductors are connected in series with the primary side of the transformer.

13. The bi-directional DC to DC converter of claim 12, comprising a full-bridge switcher circuit connected to the second terminal set, wherein the at least one capacitor and the at least one inductor of the plurality of inductors are connected in series with the full-bridge switcher circuit.

14. The bi-directional DC to DC converter of claim 13, wherein the transformer comprises a secondary side connected to one of a full-bridge synchronous rectifier circuit, a half-bridge synchronous rectifier circuit and a push-pull synchronous rectifier circuit.

15. The bi-directional DC to DC converter of claim 12, comprising a half-bridge switcher circuit connected to the second terminal set, wherein the at least one capacitor and the at least one inductor of the plurality of inductors are connected in series with the half-bridge switcher circuit.

16. The bi-directional DC to DC converter of claim 15, wherein the transformer comprises a secondary side connected to one of a full-bridge synchronous rectifier circuit, a half-bridge synchronous rectifier circuit and a push-pull synchronous rectifier circuit.

17. The bi-directional DC to DC converter of claim 12, comprising a push-pull switcher circuit connected to the second terminal set, wherein the at least one capacitor and the at least one inductor of the plurality of inductors are connected in series with the push-pull switcher circuit.

18. The bi-directional DC to DC converter of claim 17, wherein the transformer comprises a secondary side connected to one of a full-bridge rectifier circuit, a full-bridge synchronous rectifier circuit, a half-bridge rectifier circuit, a half bridge synchronous rectifier circuit, a push-pull rectifier circuit and a push-pull synchronous rectifier circuit.

19. The bi-directional DC to DC converter of claim 12, wherein the first inductor is implemented as a magnetizing inductor of the transformer and the second inductor is implemented as an external inductor.

20. A bi-directional DC to DC converter comprising:
a switcher circuit adapted for generating a square-wave voltage waveform;
a transformer comprising a primary side and secondary side;
a first resonant tank circuit employed during power transfer along a first direction through the bi-directional DC to DC converter, the first resonant tank circuit connected between the switcher circuit and the transformer, the first resonant tank circuit comprising a first inductor connected in parallel with the primary side of the transformer;
a second resonant tank circuit employed during power transfer along a second direction opposite to the first direction through the bi-directional DC to DC converter, the second resonant tank circuit connected between the switcher circuit and the transformer, and the second resonant tank circuit comprising a second inductor connected in parallel with the switcher circuit, the first inductor being different from the second inductor; and
a synchronous rectifier circuit connected to the secondary side of the transformer, wherein each of the first resonant tank circuit and the second resonant tank circuit comprise at least one capacitor and at least one inductor that are connected in series with the switcher circuit and the primary side of the transformer, and wherein each of the first resonant tank circuit and the second resonant tank circuit share at least one capacitor and at least one inductor that are connected in series with the first inductor in the first resonant tank circuit and with the second inductor in the second resonant tank circuit.

21. The bi-directional DC to DC converter of claim 20, wherein the switcher circuit comprises one of a full-bridge switcher circuit, a half-bridge switcher circuit and a push-pull switcher circuit.

22. The bi-directional DC to DC converter of claim 21, wherein the synchronous rectifier circuit comprises one of a full-bridge synchronous rectifier circuit, a half-bridge synchronous rectifier circuit and a push-pull synchronous rectifier circuit.

23. The bi-directional DC to DC converter of claim 21, wherein the synchronous rectifier circuit comprises one of a dissipative snubber and a non-dissipative snubber.

24. The bi-directional DC to DC converter of claim 20, wherein the first resonant tank circuit and the second resonant tank circuit comprise the same resonant configuration.

* * * * *